(12) United States Patent
Wollrath et al.

(10) Patent No.: US 6,463,446 B1
(45) Date of Patent: Oct. 8, 2002

(54) METHOD AND APPARATUS FOR TRANSPORTING BEHAVIOR IN AN EVENT-BASED DISTRIBUTED SYSTEM

(75) Inventors: Ann M. Wollrath, Groton, MA (US); James H. Waldo, Dracut, MA (US); Peter C. Jones, Winchester, MA (US); Kenneth C.R.C. Arnold, Lexington, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/044,933

(22) Filed: Mar. 20, 1998

Related U.S. Application Data
(60) Provisional application No. 60/076,048, filed on Feb. 26, 1998.

(51) Int. Cl.[7] .............................. G06F 17/30
(52) U.S. Cl. ................ 707/203; 707/103; 709/330
(58) Field of Search ........................ 707/103–104, 707/202–203, 102; 709/330

(56) References Cited

U.S. PATENT DOCUMENTS

| | | | |
|---|---|---|---|
| 4,491,946 A | 1/1985 | Kryskow, Jr. et al. ...... 370/453 |
| 4,713,806 A | 12/1987 | Oberlander et al. ........ 370/358 |
| 4,809,160 A | 2/1989 | Mahon et al. .............. 713/200 |
| 4,823,122 A | 4/1989 | Mann et al. ........... 340/825.28 |
| 4,939,638 A | 7/1990 | Stephenson et al. ........ 710/244 |
| 4,956,773 A | 9/1990 | Saito et al. .................. 717/3 |
| 5,088,036 A | 2/1992 | Ellis et al. .................. 395/425 |
| 5,109,486 A | 4/1992 | Seymour .................... 709/224 |
| 5,187,787 A | 2/1993 | Skeen et al. ................ 395/600 |
| 5,218,699 A | 6/1993 | Brandle et al. ............. 709/328 |
| 5,257,369 A | 10/1993 | Skeen et al. ................ 395/650 |
| 5,293,614 A | 3/1994 | Ferguson et al. ........... 395/600 |
| 5,297,283 A | 3/1994 | Kelly et al. ................. 709/104 |
| 5,307,490 A | 4/1994 | Davidson et al. ........... 709/328 |
| 5,311,591 A | 5/1994 | Fischer ....................... 713/156 |
| 5,339,435 A | 8/1994 | Lubkin et al. ................ 717/11 |
| 5,386,568 A | 1/1995 | Wold et al. .................. 707/10 |
| 5,390,328 A | 2/1995 | Frey et al. ................... 709/315 |
| 5,423,042 A | 6/1995 | Jalili et al. ................... 709/328 |
| 5,440,744 A | 8/1995 | Jacobson et al. ........... 709/203 |
| 5,448,740 A | 9/1995 | Kiri et al. ....................... 717/8 |
| 5,452,459 A | 9/1995 | Drury et al. .................... 707/3 |
| 5,455,952 A | 10/1995 | Gjovaag ........................ 717/1 |
| 5,471,629 A * | 11/1995 | Risch ......................... 707/201 |
| 5,475,792 A | 12/1995 | Stanford et al. ............ 704/233 |
| 5,481,721 A | 1/1996 | Serlet et al. ................ 709/315 |
| 5,504,921 A * | 4/1996 | Dev et al. ................... 709/223 |
| 5,511,197 A | 4/1996 | Hill et al. .................... 709/328 |

(List continued on next page.)

FOREIGN PATENT DOCUMENTS

| | | |
|---|---|---|
| EP | 0 300 516 A | 1/1989 |
| EP | 0 351 536 A3 | 1/1990 |
| EP | 0 384 339 A | 2/1990 |

(List continued on next page.)

OTHER PUBLICATIONS

Alexander, et al., "Active Bridging", Proceedings of the ACM/SIGCOMM'97 Conference, Cannes, France, 9/97.

(List continued on next page.)

*Primary Examiner*—Hosain T. Alam
*Assistant Examiner*—Jean Bolte Fleurantin
(74) *Attorney, Agent, or Firm*—Finnegan, Henderson, Farabow, Garrett & Dunner, L.L.P.

(57) ABSTRACT

In a distributed computing system, a first process may register interest in an event occurring in another address space or physical machine in such a way as to allow the subsequent notification of the event's occurrence to contain an object that includes methods that are to be run on receipt of the notification. When the notification is received, either by the first process or by some other entity designated by the first process to be the final point of notification, the methods may be executed as specified by the first process.

22 Claims, 5 Drawing Sheets

U.S. PATENT DOCUMENTS

| | | | |
|---|---|---|---|
| 5,524,244 A | 6/1996 | Robinson et al. ............... 717/5 |
| 5,548,726 A | 8/1996 | Pettus ........................ 709/221 |
| 5,553,282 A | 9/1996 | Parrish et al. ................. 707/10 |
| 5,555,367 A | 9/1996 | Premerlani et al. ............ 707/4 |
| 5,555,427 A | 9/1996 | Aoe et al. .................... 709/201 |
| 5,557,798 A | 9/1996 | Skeen et al. ................. 395/650 |
| 5,560,003 A | 9/1996 | Nilsen et al. ................ 395/600 |
| 5,561,785 A | 10/1996 | Blandy et al. ......... 395/497.01 |
| 5,577,231 A | 11/1996 | Scaizi et al. .................. 703/26 |
| 5,594,921 A | 1/1997 | Pettus ........................ 710/11 |
| 5,603,031 A | 2/1997 | White et al. ................ 395/683 |
| 5,617,537 A | 4/1997 | Yamada et al. ............. 709/214 |
| 5,628,005 A | 5/1997 | Hurvig ........................... 707/8 |
| 5,640,564 A | 6/1997 | Hamilton et al. ........... 709/315 |
| 5,644,768 A | 7/1997 | Periwal et al. .............. 709/102 |
| 5,652,888 A | 7/1997 | Burgess ...................... 709/318 |
| 5,655,148 A | 8/1997 | Richman et al. ............ 395/828 |
| 5,659,751 A | 8/1997 | Heninger .................... 395/685 |
| 5,671,225 A | 9/1997 | Hooper et al. .............. 370/468 |
| 5,675,796 A | 10/1997 | Hodges et al. .............. 709/100 |
| 5,680,573 A | 10/1997 | Rubin et al. ................. 711/129 |
| 5,680,617 A * | 10/1997 | Gough et al. ............... 707/104 |
| 5,684,955 A | 11/1997 | Meyer et al. ................ 709/316 |
| 5,689,709 A | 11/1997 | Corbett et al. .............. 709/315 |
| 5,706,435 A | 1/1998 | Barbara ....................... 711/141 |
| 5,706,502 A | 1/1998 | Foley et al. .................. 707/10 |
| 5,724,588 A | 3/1998 | Hill et al. .................... 709/328 |
| 5,727,145 A | 3/1998 | Nessett et al. .............. 713/200 |
| 5,737,607 A | 4/1998 | Hamilton et al. .............. 717/1 |
| 5,745,678 A | 4/1998 | Herzberg et al. ........... 713/200 |
| 5,745,687 A | 4/1998 | Herzberg et al. ........... 709/201 |
| 5,745,695 A | 4/1998 | Gilchrist et al. ............ 709/227 |
| 5,745,703 A | 4/1998 | Cetjin et al. ................ 709/238 |
| 5,745,755 A | 4/1998 | Covey ........................ 707/203 |
| 5,748,897 A | 5/1998 | Katiyar ....................... 709/219 |
| 5,754,849 A | 5/1998 | Dyer et al. .................. 707/101 |
| 5,757,925 A | 5/1998 | Faybishenko ............... 709/203 |
| 5,761,656 A | 6/1998 | Ben-Schachar ................ 707/4 |
| 5,764,897 A | 6/1998 | Khalidi ....................... 709/201 |
| 5,768,532 A | 6/1998 | Megerian .................... 709/245 |
| 5,774,551 A | 6/1998 | Wu et al. .................... 713/155 |
| 5,778,187 A | 7/1998 | Monteiro et al. ........... 709/231 |
| 5,778,228 A | 7/1998 | Wei ............................. 709/328 |
| 5,778,368 A | 7/1998 | Hogan et al. ................. 707/10 |
| 5,787,425 A | 7/1998 | Bigus ............................ 707/6 |
| 5,787,431 A | 7/1998 | Shaughnessy ............... 707/100 |
| 5,790,548 A | 8/1998 | Sistanizadeh et al. ....... 370/401 |
| 5,802,367 A | 9/1998 | Held et al. ................... 709/332 |
| 5,808,911 A | 9/1998 | Tucker et al. ............... 709/316 |
| 5,809,507 A | 9/1998 | Cavanaugh, III ........... 707/103 |
| 5,812,819 A | 9/1998 | Rodwin et al. ............... 703/23 |
| 5,813,013 A * | 9/1998 | Shakib et al. ............... 707/102 |
| 5,815,149 A | 9/1998 | Mutschler, III et al. .... 345/335 |
| 5,815,709 A | 9/1998 | Waldo et al. ................ 712/300 |
| 5,815,711 A | 9/1998 | Sakamoto et al. ............. 717/1 |
| 5,818,448 A | 10/1998 | Katiyar ....................... 345/335 |
| 5,829,022 A | 10/1998 | Watanabe et al. ........... 711/118 |
| 5,832,219 A | 11/1998 | Pettus ........................ 709/203 |
| 5,832,529 A | 11/1998 | Wollrath et al. ............ 707/206 |
| 5,832,593 A | 11/1998 | Malik et al. ................... 29/750 |
| 5,835,737 A | 11/1998 | Sand et al. .................. 710/113 |
| 5,842,018 A | 11/1998 | Atkinson et al. ........... 707/501 |
| 5,844,553 A | 12/1998 | Hao et al. .................... 345/329 |
| 5,845,129 A | 12/1998 | Wendorf et al. ............ 710/200 |
| 5,860,004 A | 1/1999 | Fowlow et al. ................ 717/1 |
| 5,860,153 A | 1/1999 | Matena et al. .............. 711/216 |
| 5,864,862 A | 1/1999 | Kriens et al. ............... 707/103 |
| 5,864,866 A | 1/1999 | Henckel et al. ............. 707/103 |
| 5,872,928 A | 2/1999 | Lewis et al. ................ 709/222 |
| 5,872,973 A | 2/1999 | Mitchell et al. ............ 709/332 |
| 5,875,335 A | 2/1999 | Beard ............................ 717/5 |
| 5,878,411 A | 3/1999 | Borroughs et al. ............ 707/4 |
| 5,884,024 A | 3/1999 | Lim et al. .................... 713/201 |
| 5,884,079 A | 3/1999 | Furusawa ...................... 717/1 |
| 5,887,134 A | 3/1999 | Ebrahim ....................... 707/10 |
| 5,889,951 A | 3/1999 | Lombardi ................... 709/219 |
| 5,890,158 A | 3/1999 | House et al. ............... 713/201 |
| 5,892,904 A | 4/1999 | Atkinson et al. ............. 705/59 |
| 5,933,497 A | 8/1999 | Beetcher et al. ............ 713/201 |
| 5,935,249 A | 8/1999 | Stern et al. .................... 707/8 |
| 5,940,827 A | 8/1999 | Hapner et al. ................. 717/3 |
| 5,944,793 A | 8/1999 | Islaw et al. ................. 709/220 |
| 5,946,485 A | 8/1999 | Weeren et al. ................ 713/3 |
| 5,946,694 A | 8/1999 | Copeland et al. ........... 707/103 |
| 5,956,509 A | 9/1999 | Kevner ....................... 709/330 |
| 5,966,531 A | 10/1999 | Skeen et al. ................ 709/315 |
| 5,969,967 A | 10/1999 | Aahlad et al. ................. 700/2 |
| 5,987,506 A | 11/1999 | Carter et al. ................ 709/213 |
| 5,999,179 A | 12/1999 | Kekic et al. ................ 345/349 |
| 6,003,763 A | 12/1999 | Gallagher et al. .......... 235/379 |
| 6,009,103 A | 12/1999 | Woundy ..................... 370/401 |
| 6,016,496 A | 1/2000 | Roberson ................... 707/103 |
| 6,026,414 A | 2/2000 | Anglin ........................ 707/204 |
| 6,031,977 A | 2/2000 | Pettus ........................ 709/230 |
| 6,061,699 A | 5/2000 | DiCecco et al. ............ 707/513 |
| 6,061,713 A | 5/2000 | Bharadhwaj ................ 709/203 |

FOREIGN PATENT DOCUMENTS

| | | |
|---|---|---|
| EP | 0 497 022 A1 | 1/1991 |
| EP | 0 472 874 A1 | 3/1992 |
| EP | 0 474 340 A | 3/1992 |
| EP | WO 93 25962 | 6/1992 |
| EP | 0 555 997 A | 8/1993 |
| EP | 0 565 849 A | 10/1993 |
| EP | 0 625 750 A | 11/1994 |
| EP | 0 635 792 A | 1/1995 |
| EP | 0 651 328 A | 5/1995 |
| EP | 0 660 231 A | 6/1995 |
| EP | 0 718 761 A | 12/1995 |
| EP | 0 767 432 A2 | 12/1995 |
| EP | 0 697 655 A2 | 2/1996 |
| EP | 0 810 524 A | 5/1997 |
| EP | 0 778 520 A2 | 6/1997 |
| EP | 0 794 493 A2 | 9/1997 |
| EP | 0 803 810 A2 | 10/1997 |
| EP | 0 803 811 A | 10/1997 |
| EP | 0 805 393 A2 | 11/1997 |
| EP | 0 817 020 A | 1/1998 |
| EP | 0 817 022 A2 | 1/1998 |
| EP | 0 817 025 A | 1/1998 |
| EP | 0 836 140 A2 | 4/1998 |
| GB | 2 253 097 A | 8/1992 |
| GB | 2 262 825 A | 6/1993 |
| GB | 2 305 087 A | 3/1997 |
| JP | 11-45187 | 2/1999 |
| WO | 0 568 849 A2 | 4/1992 |
| WO | WO92/07335 | 4/1992 |
| WO | WO92/09948 | 6/1992 |
| WO | 0 569 195 A2 | 11/1993 |
| WO | WO94/03855 A | 2/1994 |
| WO | WO96/03692 A | 2/1996 |
| WO | WO96/10787 A | 4/1996 |
| WO | WO96/18947 A | 6/1996 |
| WO | WO96/24099 A | 8/1996 |
| WO | WO98/02814 | 1/1998 |
| WO | WO98/04971 | 2/1998 |

OTHER PUBLICATIONS

Anonymous: "Change–Notification Service for Shared Files" IBM Technical Disclosure Bulletin, vol. 36, No. 8, pp. 77–82, XP002108713 New York, US.

Anonymous: "Resource Preemption for Priority Scheduling." Nov. 1973. IBM Technical Disclosure Bulletin, vol. 16, NO. 6, p. 1931 XP002109435 New Yor, US.

Beech et al., "Object Databases as Generalizations of Relational Databases," Computer Standards & Interfaces, vol. 13, Nos. 1/3, pp. 221–230, (Jan. 1991) Amsterdam, NL.

Bertino et al., "Object–Oriented Database Management Systems: Concepts and Issues," Computer, vol. 24, No. 4, pp. 33–47, (Apr. 1991), Los Alamitos, CA.

Betz, Mark; "Interoperable objects: laying the foundation for distributed object computing"; Dr. Dobb's Journal, vol. 19, No. 11, p. 18(13); (Oct. 1994).

Bevan, D.I., "An Efficient Reference Counting Solution To The Distributed Garbage Collection Problem", Parall Computing, NL, Elsevier Publishers, Amsterdam, vol. 9, No. 2, pp. 179–192.

Dave A et al: "Proxies, Applications Interface, and Distributed Systems", Proceedings International Workshop on Object Orientation in Operating Systems, Sep. 24, 1992, pp. 212–220.

Deux O et al: "The 02 System" Communications of the Association for Computing Machinery, vol. 34, No. 10, Oct. 1, 1991, pp. 34–48.

Drexler, K. Eric, et al., "Incentive Engineering for Computational Resource Management," The Ecology of Computation, Elsevier Science Publishers B.V., 1988, pp. 231–66.

Droms, R., "RFC 1541 Dynamic Host Configuration Protocol", HTTP://WWW.CIS.OHIO–Stage.Edu/HTBIN/RFC/RFC1541.Html, Oct. 1993, pp. 1–33.

Emms J: "A Definition of an Acess Control Systems Language" Computer Standards and Interfaces, vol. 6, No. 4, Jan. 1, 1987, pp. 443–454.

Gosling et al., "The Java (TM) Language Specification", Addison–Wesley, 1996.

Gottlob et al., "Extending Object–Oriented Systems with Roles," ACM Transactions on information systems, vol. 14, No. 3, pp. 268–296 (Jul. 1996).

Guth, Rob: "JavaOne: Sun to Expand Java Distributed Computing Effort", "Http://www.Sunworld.com/SWOL–02–1998/SWOL–02–Sunspots.Html," XP–002109935, p. 1, 1998.

Hamilton et al., "Subcontract: a flexible base for distributed programming"; Proceedings of 14th Symposium of Operating System Principles; (Dec. 1993).

Hartman, J., Manber, U., et al., Liquid Software: A new paradigm for networked systems, Technical Report 96–11, Department of Comp. Sci., Univ. of Arizona, 6/96.

Hunt, N., "IDF: A Graphical Data Flow Programming Language for Image Processing and Computer Vision", Proceedings of the International Conference on Systems, Man, and Cybernetics, Los Angeles, Nov. 4–7, pp. 351–360, (1990).

IBM (TM) Technical Disclosure Bulletin, "Object Location Algorithm," vol. 36, No. 09B, pp. 257–258, Sep. 1993.

IBM (TM) Technical Disclosure Bulletin, "Retrieval of Qualified Variables Using Extendible Hashing," vol. 36, No. 12, pp. 301–303, Dec. 1993.

IBM: "Chapter 6—Distributed SOM (DSOM)" SOMOObjects Developer Toolkit Users Guide, Version 2.1, (Oct. 1994), pp. 6–1–6–90.

Jones, Richard, et al., "Garbage Collection: Algorithms for Automatic Dynamic Memory Management," pp. 165–175, John Wiley & Sons, 1996.

Kay, Michael H. et al., "An Overview of the Raleigh Object–Oriented Database System", ICL Technical Journal, vol. 7, No. 4, pp. 780–798, (Nov. 1991), Oxford, GB.

Kougiouris et al.; "Support for Space Efficient Object Invocation in Spring"; (Sep. 1994).

Lindholm et al., "The Java (TM) Virtual Machine Specification", Addison–Wesley, 1996.

Mitchell et al.; "An Overview of the Spring System"; (Feb. 1994).

Orfali R. et al., "The Essential Distributed Objects Survival Guide," Chapter 11: Corba Commercial ORBs, pp. 203–215, John Wiley & Sons, Inc., (1996).

Riggs Roger et al., "Pickling State in the Java (TM) System," USENIX Association Conference on Object–Oriented Technologies and Systems, XP–002112719, Jun. 17–21, 1996, pp. 241–250.

Rosenberry et al., "Understanding DCE"; Chapters 1–3, 6; (1992).

Venners, B., "Jini Technology, Out of the Box", JAVAWorld, Online!, pp 1–4, Dec. 1998.

Waldo J et al: "Events in an RFC based distributed system" Proceedings of the 1995 USENIX Technical Conference Proceedings USENIX Winter 1995 Technical Conference, New Orleans, LA, USA, Jan. 16–20, 1995, pp. 131–142.

Wilson, P.R., et al., "Design of the Opportunistic Garbage Collector," Proceedings of the Object Oriented Programming Systems Languages And Applications Conference, New Orleans, vol. 24, No. 10, Oct. 1989.

Wu, Xuequn, "A Type system for an Object–Oriented Database System," Proceedings of the International Computer Software and Applications Conference (COMPSAC), pp. 333–338, Sep. 11–13, 1991, Tokyo, Japan.

Yemini, Y. and S. da silva, "Towards Programmable Networks", IFIP/IEEE International Workshop on Distributed Systems: Operations and Management, L'Aquila, Italy, 10/96.

Yin J. et al., "Using Leases to Support Server Driven Consistency in Large–Scale Systems", Computer Services Department, University of Texas at Austin, pp. 285–294.

The GemStone object database management system, Butterworth et al., Oct. 1991, ACM–v 34, 1–14.*

Waldo Jim; Trouble with types C + + Advisor Tutorial Column; pp. 1–4, Dec. 1995.*

Mullender, *Distributed Systems*, Second Edition, Addison–Wesley, 1993.

Howard et al., *Scale and Performance in a Distributed File System*, ACM Transactions on Computer Systems, vol. 6, No. 1, Feb. 1988, pp. 51–81.

Cardelli, *Obliq. A lightweight language for network objects*, Nov. 5, 1993, pp. 1–37.

Dijkstra, *Self–stabilizing Systems in Spite of Distributed Control*, Communications of the ACM, vol. 17, No. 11, Nov. 1974, pp. 643–644.

Ousterhout et al., *The Sprite Network Operating System*, Computer, IEEE, Feb. 1988, pp. 23–36.

Dourish, *A Divergence–Based Model of Synchrony and Distribution in Collaborative Systems*, Xerox Technical Report EPC–1194–102, 1994, pp. 1–10.

Sharrott et al., *ObjectMap: Integrating High Performance Resources into a Distributed Object–oriented Environment*, ICODP, 1995.

Birrell et al., *Grapevine: An Exercise in Distributed Computing*, Communications of the ACM, vol. 25, No. 4, Apr. 1982, pp. 260–274.

*Transparent Network Computing*: Locus Computing Corporation, Jan. 5, 1995.
Gray et al., *Leases: An Efficient Fault–Tolerant Mechanism for Distributed File Cache Consistency*, ACM, 1989, pp. 202–210.
Lamport et al., *The Byzantine Generals Problem*, ACM Transactions on Programming Languages and Systems, vol. 4, No. 3, Jul. 1982, pp. 382–401.
Dolev et al., *On the Minimal Synchronism Needed for Distributed Consensus*, Journal of the ACM, vol. 34, No. 1, Jan. 1987, pp. 77–97.
Mummert et al., *Long Term Distributed File Reference Tracing: Implementation and Experience*, Carnegie Mellon University School of Computer Science, Nov. 1994, pp. 1–28.
Gelernter et al., *Parallel Programming in Linda*, Yale University, Jan. 1985, pp. 1–21.
Cannon et al., *Adding Fault–Tolerant Transaction Processing to Linda*, Software–Practice and Experience, vol. 24(5), May 1994, 449–466.
Kambhatla et al., *Recover with Limited Replay: Fault–Tolerant Processes in Linda*, Oregon Graduate Institute, Technical Report CSIE 90–019, Sep. 1990, pp. 1–16.
Anderson et al., *Persistent Linda: Linda+Transactions+ Query Processing*, Proceedings of the 13th Symposium on Fault Tolerant Systems, 1994, pp. 93–109.
Gelernter, *Generative Communications in Linda*, ACM Transactions on Programming Languages and Systems, vol. 7, No. 1, Jan. 1985, pp. 80–112.
Carriero et al., *Distributed Data Structures in Linda*, Principals of Programming Language, 1986, pp. 1–16.
Pinakis, *Using Linda as the Basis of an Operating System Microkernel*, University of Western Australia, Department of Computer Science, Aug. 1993, pp. 1–165.
Linda Database Search, Jul. 20, 1995, pp. 1–68.
Carriero et al, *Distributed Data Structures in Linda*, Yale Research Report YaleU/DCS/RR–438. Nov. 1985.
Agha et al., *Actorspaces: An Open Distributed Programming Paradigm*, University of Illinois, Report No. UIUCDCS-R–92–1766, Open Systems Laboratory TR No. 8, Nov. 1992, pp. 1–12.
Ahmed et al., *A Program Building Tool for Parallel Applications*, Yale University, Dec. 1, 1993, pp. 1–23.
Liskov et al., *Distributed Object Management in Thor*, International Workshop on Distributed Object Management, 1992, pp. 12.
Coulouris et al., *Distributed Systems Concepts and Designs*, Second Edition, Addison–Wesley, 1994.
Birrell et al., *Network Objects*, DEC SRC Research Report 115, Feb. 28, 1994.
Birrell et al., *Distributed Garbage Collection for Network Objects*, DEC SRC Research Report 116, Dec. 15, 1993.
Jaworski, *Java 1.1 Developer's Guide*, Sams.net, 1997.
Wollrath et al., *A Distributed Object Model for the Java™ System*, USENIX Association, Conference on Object–Oriented Technologies and Systems, Jun. 17–21, 1996.
Harris et al., *Proposal for a General Java Proxy Class for Distributed Systems and Other Uses*, Netscape Communications Corp., Jun. 25, 1997.
Hamilton, *Java and the Shift to Net–Centric Computing* Computer, Aug. 1996, pp. 31–39.
Chung et al., *A 'Tiny' Pascal Compiler: Part 1: The P–Code Interpreter*, Byte Publications, Inc., Sep. 1978.

Chung et al., *A 'Tiny' Pascal Compiler: Part 2: The P–Compiler*, Byte Publications, Inc., Oct. 1978.
Thompson, *Regular Expression Search Algorithm*, Communications of the ACM, vol. II, No. 6, p. 149 et seq., Jun. 1968.
Mitchell et al., *Mesa Language Manual*, Xerox Corporation.
McDaniel, *An Analysis of a Mesa Instruction Set*, Xerox Corporation, May 1982.
Pier, *A Retrospective on the Dorado, A High–Performance Personal Computer*, Xerox Corporation, Aug. 1983.
Pier, *A Retrospective on the Dorado, A High–Performce Personal Computer*, IEEE Conference Proceedings, The 10th Annual international Symposium on Computer Architecture, 1983.
Krasner, *The Smalltalk–80 Virtual Machine*, Byte Publications Inc., Aug. 1991, pp. 300–320.
*Operating Systems Review*, ACM Press, vol. 27, No. 5, Dec. 1993, pp. 217–230.
*Remote Method Invocation Specification*, Sun Microsystems, Inc., (1997), http://java.sun.com/products/jdk/1.1/docs/guide/rmi/spec/rmiTOC.doc.html.
Aldrich, J., et al., "Providing easier access to remote objects in client–server systems," Nov. 21, 1997.
Aldrich, J., et al., "Providing easier access to remote objects in client–server systems," Jan. 6–9, 1998.
Dave, Amitabh, et al., "Proxies, Application Interfaces, and Distributed System," 1992.
Dollimore, J., et al., "The Design of a System for Distributing Shared Objects," 1991.
Fleisch, B.D. & Hyde, R.L., "High performance distributed objects using distributed shared memory and remote method invocation," Jan. 6–9, 1998.
Gray, Cary, et al., "Leases: An Efficien Fault0Tolerant Mechanism for Distributed File Cache Consistency," 1989.
Guyennet, H., et al., "Distributed Shared Memory Layer for Cooperative Work Applications," 1997.
Guyennet, Herve, et al., "A New Consistency Protocol Implemented in the CALIF System," 1997.
McGrath, R., "Discovery and Its Discontents: Discovery Protocols for Ubiquitous Computing," Apr. 5, 2000.
Newmarch, J., "Chapter 3: Discovering a Lookup Service Contents," 1999.
Stevenson, D., "Token–Based Consistency of Replicated Servers," 1989.
Yin, Jian, et al., "Volume Leases for Consistency in Large–Scale Systems," Jul./Aug. 1999.
"European Search Report," Oct. 9, 2000.
"Java 1.1 Interactive Course/MUX 031–13 51 90," Apr. 15, 1997, http://www.lls.se/~muxjavaic.html.
"Local Network Monitoring to Populate Access Agent Directory," IBM Technical Disclosure Bulletin, Sep. 1999.
"Taxonomy for Distributed Network Caches," http://ringer.cs.utsa.edu/~sdykes/taxonomy.html.
Burns et al., "An Analytical Study of Opportunistic Lease Renewal", Distributed Computing Systems, $21^{st}$ International Conference, pp. 146–153, Apr. 2000.
Hoshi et al., "Allocation of the Cross–Connect Function in Leased Circuit Networks," 1992, ICC'92, conference record, SuperComm/ICC '02, D a New World of Communications, IEEE International Conference, pp. 1408–1412.
Alexander, et al., "Active Bridging", Proceeding of the ACM/SIGCOMM'97 Conference, Cannes, France, 9/97.

Anonymous: "Change–Notification Service for Shared Files" IBM Technical Disclosure Bulletin, vol. 36, No. 8, pp. 77–82, XP002108713 New York, US.

Anonymous: "Resource Preemption for Priority Scheduling." Nov. 1973. IBM Technical Disclosure Bulletin, vol. 16, No. 6, p. 1931 XP002109435 New York, US.

Beech et al., "Object Databases as Generalizations of Relational Databases," Computer Standards & Interfaces, vol. 13, Nos. 1/3, pp. 221–230, (Jan. 1991) Amsterdam, NL.

Bertino et al., "Object–Oriented Database Management Systems: Concepts and Issues," Computer, vol. 24, No. 4, pp. 33–47, (Apr. 1991), Los Alamitos, CA.

Betz, Mark; "Interoperable objects: laying the foundation for distributed object computing"; Dr. Dobb's Journal, vol. 19, No. 11, p. 18(13); (Oct. 1994).

Bevan, D.I., "An Efficient Reference Counting Solution To The Distributed Garbage Collection Problem", Parall Computing, NL, Elsevier Publishers, Amsterdam, vol. 9, No. 2, pp. 179–192.

Dave A et al: "Proxies, Application Interface, and Distributed Systems", Proceedings International Workshop on Object Orientation in Operating Systems, Sep. 24, 1992, pp. 212–220.

Deux O et al: "The O2 System" Communications of the Association for Computing Machinery, vol. 34, No. 10, Oct. 1, 1991, pp. 34–48.

Drexler, K. Eric, et al., "Incentive Engineering for Computational Resource Management," The Ecology of Computation, Elsevier Science Publishers B.V., 1988, pp. 231–66.

Droms, R., "RFC 1541 Dynamic Host Configuration Protocol", http://www.cis.ohio–state.edu/htbin/rfc/rfc1541.html, Oct. 1993, pp. 1–33.

Emms J: "A Definition of an Access Control Systems Language" Computer Standards and Interfaces, vol. 6, No. 4, Jan. 1, 1987, pp. 443–454.

Gosling et al., "The Java (TM) Language Specification", Addison–Wesley, 1996.

Gottlob et al., "Extending Object–Oriented Systems with Roles," ACM Transactions on information systems, vol. 14, No. 3, pp. 268–296 (Jul. 1996).

Guth, Rob: "JavaOne: Sun to Expand Java Distributed Computing Effect", "http://www/sunworld.com/swol–02–1998/swol–02–sunspots.html." XP–002109935, p. 1, 1998.

Hamilton et al., "Subcontract: a flexible base for distributed programming"; Proceedings of 14th Symposium of Operating System Principles; (Dec. 1993).

Hartman, J., Manber, U., et al., Liquid Software: A new paradigm for networked systems, Technical Report 96–11, Department of Comp. Sci., Univ. of Arizona, 6/96.

Hunt, N., "IDF: A Graphical Data Flow Programming Language for Image Processing and Computer Vision", Proceedings of the International Conference on Systems, Man, and Cybernetics, Los Angeles, Nov. 4–7, pp. 351–360, (1990).

IBM (TM) Technical Disclosure Bulletin, "Object Location Algorithm," vol. 36, No. 09B, pp. 257–258, Sep. 1993.

IBM (TM) Technical Disclosure Bulletin, "Retrieval of Qualified Variables Using Extendible Hashing," vol. 36, No. 12, pp. 301–303, Dec. 1993.

IBM: "Chapter 6—Distributed SOM (DSOM)" SOMObjects Developer Toolkit Users Guide, Version 2.1, (Oct. 1994), pp. 6–1–6–90.

Jones, Richard, et al., "Garbage Collection: Algorithms for Automatic Dynamic Memory Management," pp. 165–175, John Wiley & Sons, 1996.

Kay, Michael H. et al., "An Overview of the Raleigh Object–Oriented Database System", ICL Technical Journal, vol. 7, No. 4, pp. 780–798, (Nov. 1991), Oxford, GB.

Kougiouris et al.; "Support for Space Efficient Object Invocation in Spring"; (Sep. 1994).

Lindholm et al., "The Java (TM) Virtual Machine Specification", Addison Wesley, 1996.

Mitchell et al.; "An Overview of the Spring System"; (Feb. 1994).

Orfali R. et al., "The Essential Distributed Objects Survival Guide," Chapter 11: Corba Commercial ORBs, pp. 203–215, John Wiley & Sons, Inc., (1996).

Riggs Roger et al., "Pickling State in the Java (TM) System," Usenix Association Conference on Object–Oriented Technologies and Systems, XP–002112719, Jun. 17–21, 1996, pp. 241–250.

Rosenberry et al., "Understanding DCE"; Chapters 1–3, 6; (1992).

Venners, B., "Jini Technology, Out of the Box", JavaWorld, Online!, pp. 1–4, Dec. 1998.

Waldo J et al: "Events in an RPC based distributed system" Proceedings of the 1995 Usenix Technical Conference, Proceedings Usenix Winter 1995 Technical Conference, New Orleans, LA. USA, Jan. 16–20, 1995, pp. 131–142.

Wilson, P.R., et al., "Design of the Opportunistic Garbage Collector," Proceedings of the Object Oriented Programming Systems Languages And Applications Conference, New Orleans, vol. 24, No. 10, Oct. 1989.

Wu, Xuequn, "A Type System for an Object–Oriented Database System," Proceedings of the International Computer Software and Applications Conference (COMPSAC), pp. 333–338, Sep. 11–13, 1991, Tokyo, Japan.

Yemini, Y. and S. da silva, "Towards Programmable Networks", IFIP/IEEE International Workshop on Distributed Systems: Operations and Management, L'Aquila, Italy, 10/96.

Yin J. et al., "Using Leases to Support Server Driven Consistency in Large–Scale Systems", Computer Services Department, University of Texas at Austin, pp. 285–294.

Birrell et al., *Implementing Remote Procedure Calls*, ACM Transactions on Computer Systems, vol. 2, No. 1, Feb. 1984, pp. 39–59.

* cited by examiner

Table

| Event Identification | Object To Be Notified | Object To Be Passed |
|---|---|---|
| Disk_Full | VM308 | SendPage(< parameters>) |
| Timer_Event_ Time_Out | Alarm_System | Make_Alarm_ Sound |

FIG. 3B

METHOD AND APPARATUS FOR TRANSPORTING BEHAVIOR IN AN EVENT-BASED DISTRIBUTED SYSTEM

RELATED APPLICATIONS

The following identified U.S. patent applications are relied upon and are incorporated by reference in this application.

Provisional U.S. patent application Ser. No. 60/076,048, entitled "Distributed Computing System," filed on Feb. 26, 1998.

U.S. patent application Ser. No. 09/044,923, entitled "Method and System for Leasing Storage," and filed on Mar. 20, 1998.

U.S. patent application Ser. No. 09/044,838, entitled "Method, Apparatus, and Product for Leasing of Delegation Certificates in a Distributed System," and filed on Mar. 20, 1998.

U.S. patent application Ser. No. 09/044,834, entitled "Method, Apparatus and Product for Leasing of Group Membership in a Distributed System," and filed on Mar. 20, 1998.

U.S. patent application Ser. No. 09/044,916, entitled "Leasing for Failure Detection," and filed on Mar. 20, 1998.

U.S. patent application Ser. No. 09/044,919, entitled "Deferred Reconstruction of Objects and Remote Loading for Event Notification in a Distributed System," and filed on Mar. 20, 1998.

U.S. patent application Ser. No. 09/044,938, entitled "Methods and Apparatus for Remote Method Invocation," and filed on Mar. 20, 1998.

U.S. patent application Ser. No. 09/045,652, entitled "Method and System for Deterministic Hashes to Identify Remote Methods," and filed on Mar. 20, 1998.

U.S. patent application Ser. No. 09/044,790, entitled "Method and Apparatus for Determining Status of Remote Objects in a Distributed System," and filed on Mar. 20, 1998.

U.S. patent application Ser. No. 09/044,930, entitled "Downloadable Smart Proxies for Performing Processing Associated with a Remote Procedure Call in a Distributed System," and filed on Mar. 20, 1998.

U.S. patent application Ser. No. 09/044,917, entitled "Suspension and Continuation of Remote Methods," and filed on Mar. 20, 1998.

U.S. patent application Ser. No. 09/044,835, entitled "Method and System for Multi-Entry and Multi-Template Matching in a Database," and filed on Mar. 20, 1998.

U.S. patent application Ser. No. 09/044,839, entitled "Method and System for In-Place Modifications in a Database," and filed on Mar. 20, 1998.

U.S. patent application Ser. No. 09/044,945, entitled "Method and System for Typesafe Attribute Matching in a Database," and filed on Mar. 20, 1998.

U.S. patent application Ser. No. 09/044,931, entitled "Dynamic Lookup Service in a Distributed System," and filed on Mar. 20, 1998.

U.S. patent application Ser. No. 09/044,939, entitled "Apparatus and Method for Providing Downloadable Code for Use in Communicating with a Device in a Distributed System," and filed on Mar. 20, 1998.

U.S. patent application Ser. No. 09/044,826, entitled "Method and System for Facilitating Access to a Lookup Service," and filed on Mar. 20, 1998.

U.S. patent application Ser. No. 09/044,932, entitled "Apparatus and Method for Dynamically Verifying Information in a Distributed System," and filed on Mar. 20, 1998.

U.S. patent application Ser. No. 09/030,840, entitled "Method and Apparatus for Dynamic Distributed Computing Over a Network," and filed on Feb. 26, 1998.

U.S. patent application Ser. No. 09/044,936, entitled "An Interactive Design Tool for Persistent Shared Memory Spaces," and filed on Mar. 20, 1998.

U.S. patent application Ser. No. 09/044,934, entitled "Polymorphic Token-Based Control," and filed on Mar. 20, 1998.

U.S. patent application Ser. No. 09/044,915, entitled "Stack-Based Access Control," and filed on Mar. 20, 1998.

U.S. patent application Ser. No. 09/044,944, entitled "Stack-Based Security Requirements," and filed on Mar. 20, 1998.

U.S. patent application Ser. No. 09/044,837, entitled "Per-Method Designation of Security Requirements," and filed on Mar. 20, 1998.

FIELD OF THE INVENTION

This invention relates generally to a distributed computer system and more specifically to event handling procedures in a distributed computer system.

BACKGROUND OF THE INVENTION

Distributed computer systems are systems in which the programming and data that the computer operates on are spread out over more than one computer, usually over a network with many computers. One conventional method for organizing a distributed system uses the client-server model, in which one part of the distributed system (the client) asks for some service from another part of the distributed system (the server). The server responds and then handles the client's request appropriately.

Under the client-server model, when the client encounters a procedure located at the server, the procedure may be implemented using some form of a Remote Procedure Call (RPC): the client informs the server that it would like the procedure executed using certain parameters, the server executes the procedure, and the server returns the results of the execution to the client.

An alternative method for organizing distributed systems uses the event/notification model. In this model, a "listener" process, which is interested in the occurrence of an event within another entity within the system, registers its interest with a second process, a "notifier" process, designed to monitor such events. When the event occurs, the notifier notifies the listener or notifies another process (i.e., a third party process) designated by the listener when registering with the notifier. After receiving the event notification, that notified entity (i.e., the listener or the third party listener, as the case may be) may execute a function designated in the notification and present in the address space of the notified process. In the event-notification model, there is no single point of control as in the client-server model; instead, control is determined by notifications sent in response to the occurrence of designated events.

In a non-distributed system, the association of an event with the function to be run in response to the notification, called a callback function, is straightforward, since the event, the listener, and the callback function are all in a single address space. Life is not so simple in a distributed system. The listener may be in one address space or physical machine, the event may be generated in a second address space or physical machine (e.g., the address space of the notifier or an address space that the notifier monitors), and the notification may be sent to a third address space or physical machine (e.g., the address space of the third party process). This makes it difficult for the listener to insure that the third party process will be able to respond to the event in an appropriate manner, as the two may be separated and, possibly, might not even know of the other's existence. For example, the listener, to ensure that the correct function is executed by the third party, must keep track of whether the function is available in the third party's address space. This can be particularly burdensome when an administrator desires to update functions in the third party's address space, as all the potential distributed users of the new function must be updated on the status of the new function.

Thus, there is a need in the art to more effectively handle distributed programs collaborating using the event-notification model. This need is particularly poignant in systems in which the requesting entity is not able to easily verify the status of a function present at the executing entity.

SUMMARY OF THE INVENTION

Objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, a first aspect consistent with the present invention includes a method for controlling program execution in a distributed computer system comprising the steps of: (1) registering interest in an occurrence of an event in the distributed computer system, the registration of interest including information identifying the occurrence of the event, an identifier of a software entity in the distributed system, and a first object including a process and parameter data corresponding to the process; (2) monitoring at least a portion of the distributed computer system for the occurrence of the registered event; (3) notifying the software entity identified in the registration of interest when the event occurs, the notification including a copy of the first object and an identification of the event that occurred; and (4) executing methods contained within the first object in response to the notifying step.

To achieve the objects and in accordance with the purpose of the invention, as embodied and broadly described herein, a second aspect consistent with the present invention includes a protocol for controlling the execution of processes in a distributed computer system, the protocol comprises a number of steps, including: (1) receiving a registration of interest in an event that is expected to occur in the distributed computer system, the registration including an identifier of a instructions for performing a process and parameter data corresponding to the process; (2) monitoring the distributed system for the occurrence of the registered event; and (3) notifying the software entity identified in the registration of interest when the event occurs, the notification including a copy of the first object and an identification of the event that occurred.

A third aspect of the present invention is a computer system comprising memories having first, second, and third virtual machines, respectively. The second virtual machine executes a process that receives, from the first virtual machine, a registration of interest in an event and transmits a message in response to the occurrence of the event, the registration of interest and the message including an object. The third virtual machine receives the message and executes methods contained within the object.

Additional aspects of the present invention, related to the first aspect, are directed to a computer readable medium and a computer data signal embodied in a carrier wave.

BRIEF DESCRIPTION OF THE DRAWINGS

The accompanying drawings, which are incorporated in and constitute a part of this specification, illustrate several embodiments consistent with this invention and, together with the description, help explain the principles of the invention. In the drawings.

FIG. 3B is a table showing exemplary event notification requests stored in a computer memory.

DETAILED DESCRIPTION

Figure 1:
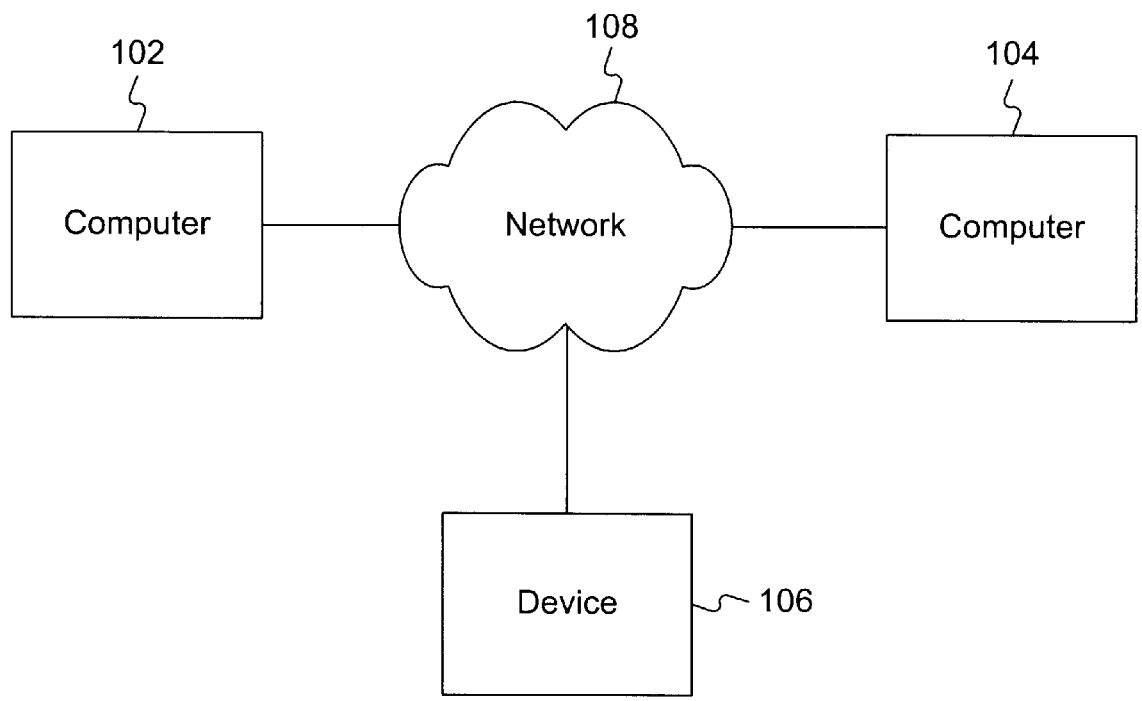
FIG. 1 is a diagram of an exemplary distributed system.

This disclosure describes a protocol allowing a listener process to register interest in an event occurring in another address space or physical machine in such a way as to allow the subsequent notification of the event's occurrence to contain an object that may include methods that are to be run on receipt of the notification. When the notification is received, either by the listener or by a third party, the methods may be executed as specified by the listener.

Referring to the accompanying drawings, a detailed description of an embodiment consistent with the present invention will now be described.

Methods and systems consistent with the present invention operate in a distributed system ("the exemplary distributed system") with various components, including both hardware and software. The exemplary distributed system (1) allows users of the system to share services and resources over a network of many devices; (2) provides programmers with tools and programming patterns that allow development of robust, secured distributed systems; and (3) simplifies the task of administering the distributed system. To accomplish these goals, the exemplary distributed system utilizes the Java™ programming environment to allow both code and data to be moved from device to device in a seamless manner. Accordingly, the exemplary distributed system is layered on top of the Java programming environment and exploits the characteristics of this environment, including the security offered by it and the strong typing provided by it. The Java programming environment is more clearly described in Jaworski, Java 1.1 *Developer's Guide*, Sams.net (1997), which is incorporated herein by reference.

In the exemplary distributed system, different computers and devices are federated into what appears to the user to be a single system. By appearing as a single system, the exemplary distributed system provides the simplicity of access and the power of sharing that can be provided by a single system without giving up the flexibility and personalized response of a personal computer or workstation. The exemplary distributed system may contain thousands of devices operated by users who are geographically disperse, but who agree on basic notions of trust, administration, and policy.

Within the exemplary distributed system are various logical groupings of services provided by one or more devices, and each such logical grouping is known as a Djinn. A "service" refers to a resource, data, or functionality that can be accessed by a user, program, device, or another service and that can be computational, storage related, communication related, or related to providing access to another user. Examples of services provided as part of a Djinn include devices, such as printers, displays, and disks; software, such as applications or utilities; information, such as databases and files; and users of the system.

Both users and devices may join a Djinn. When joining a Djinn, the user or device adds zero or more services to the Djinn and may access, subject to security constraints, any one of the services it contains. Thus, devices and users federate into a Djinn to share access to its services. The services of the Djinn appear programmatically as objects of the Java programming environment, which may include other objects, software components written in different programming languages, or hardware devices. A service has an interface defining the operations that can be requested of that service, and the type of the service determines the interfaces that make up that service.

FIG. 1 depicts the exemplary distributed system 100 containing a computer 102, a computer 104, and a device 106 interconnected by a network 108. The device 106 may be any of a number of devices, such as a printer, fax machine, storage device, computer, or other devices. The network 108 may be a local area network, wide area network, or the Internet. Although only two computers and one device are depicted as comprising the exemplary distributed system 100, one skilled in the art will appreciate that the exemplary distributed system 100 may include additional computers or devices.

Figure 2:
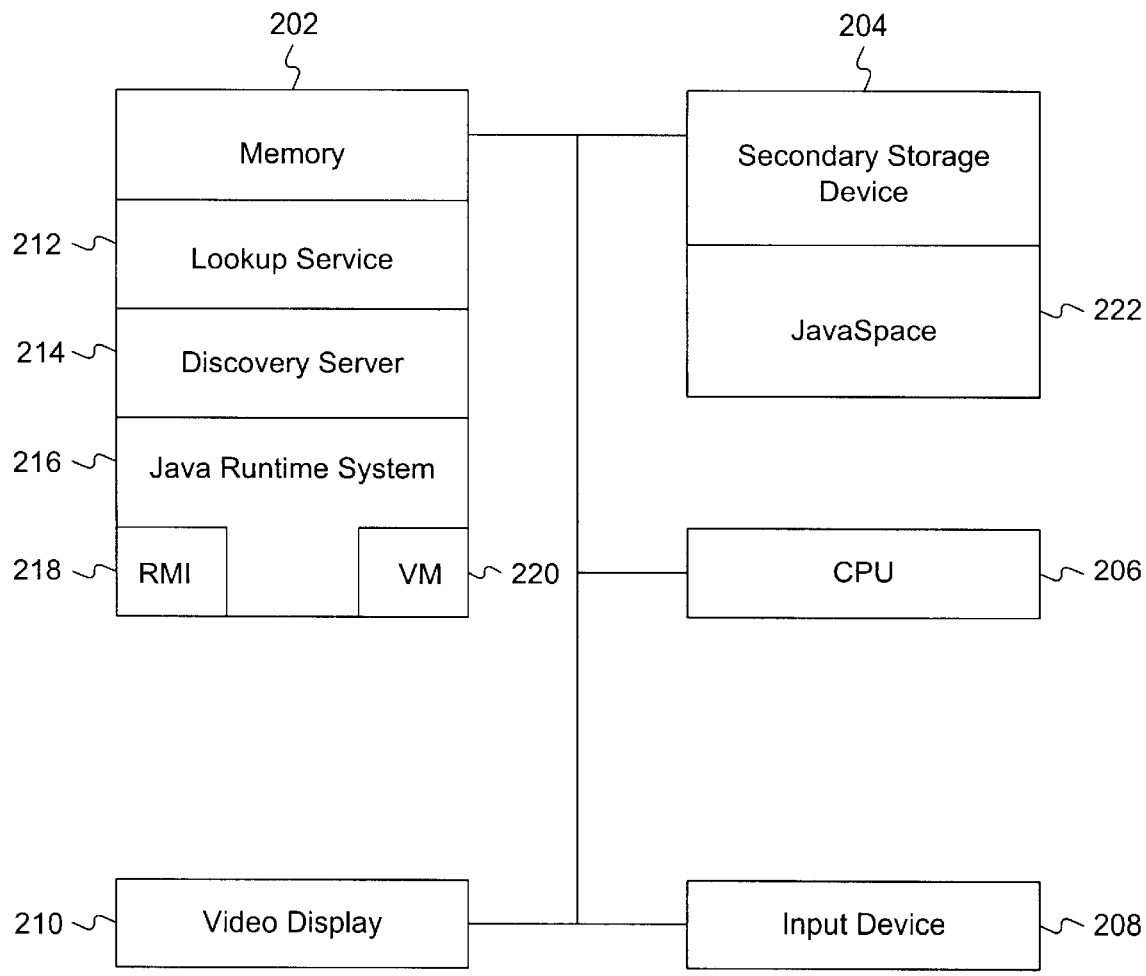
FIG. 2 is a diagram of an exemplary computer within the exemplary distributed system.

FIG. 2 depicts the computer 102 in greater detail to show a number of the software components of the exemplary distributed system 100. One skilled in the art will appreciate that computer 104 or device 106 may be similarly configured. Computer 102 includes a memory 202, a secondary storage device 204, a central processing unit (CPU) 206, an input device 208, and a video display 210. The memory 202 includes a lookup service 212, a discovery server 214, and a Java™ runtime system 216. The Java runtime system 216 includes the Java™ remote method invocation system (RMI) 218 and a Java™ virtual machine 220. The secondary storage device 204 includes a JavaSpace™ 222.

As mentioned above, the exemplary distributed system 100 is based on the Java programming environment and thus makes use of the Java runtime system 216. The Java runtime system 216 includes the Java™ API, allowing programs running on top of the Java runtime system to access, in a platform-independent manner, various system functions, including windowing capabilities and networking capabilities of the host operating system. Since the Java API provides a single common API across all operating systems to which the Java runtime system 216 is ported, the programs running on top of a Java runtime system run in a platform-independent manner, regardless of the operating system or hardware configuration of the host platform. The Java runtime system 216 is provided as part of the Java™ software development kit available from Sun Microsystems of Mountain View, Calif.

The Java virtual machine 220 also facilitates platform independence. The Java virtual machine 220 acts like an abstract computing machine, receiving instructions from programs in the form of byte codes and interpreting these byte codes by dynamically converting them into a form for execution, such as object code, and executing them. RMI 218 facilitates remote method invocation by allowing objects executing on one computer or device to invoke methods of an object on another computer or device. Both RMI and the Java virtual machine are also provided as part of the Java software development kit.

The lookup service 212 defines the services that are available for a particular Djinn. That is, there may be more than one Djinn and, consequently, more than one lookup service within the exemplary distributed system 100. The lookup service 212 contains one object for each service within the Djinn, and each object contains various methods that facilitate access to the corresponding service. The lookup service 212 and its access are described in greater detail in co-pending U.S. patent application Ser. No. 09/044, 826, entitled "Method and System for Facilitating Access to a Lookup Service," which has previously been incorporated by reference.

The discovery server 214 detects when a new device is added to the exemplary distributed system 100, during a process known as boot and join or discovery, and when such a new device is detected, the discovery server passes a reference to the lookup service 212 to the new device, so that the new device may register its services with the lookup service and become a member of the Djinn. After registration, the new device becomes a member of the Djinn, and as a result, it may access all the services contained in the lookup service 212. The process of boot and join is described in greater detail in co-pending U.S. patent application Ser. No. 09/044,939, entitled "Apparatus and Method for providing Downloadable Code for Use in Communicating with a Device in a Distributed System," which has previously been incorporated by reference.

The JavaSpace 222 is an object repository used by programs within the exemplary distributed system 100 to store objects. Programs use the JavaSpace 222 to store objects persistently as well as to make them accessible to other devices within the exemplary distributed system. JavaSpaces are described in greater detail in co-pending U.S. patent application Ser. No. 08/971,529, entitled "Database System Employing Polymorphic Entry and Entry Matching," assigned to a common assignee, filed on Nov. 17, 1997, which is incorporated herein by reference. One skilled in the art will appreciate that the exemplary distributed system 100 may contain many lookup services, discovery servers, and JavaSpaces.

Although systems and methods consistent with the present invention are described as operating in the exemplary distributed system and the Java programming environment, one skilled in the art will appreciate that the present invention can be practiced in other systems and other programming environments. Additionally, although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. Sun, Sun Microsystems, the SunLogo, Java, and Java-based trademarks are trademarks or registered trademarks of Sun Microsystems Inc. in the United States and other countries.

Figure 3A:
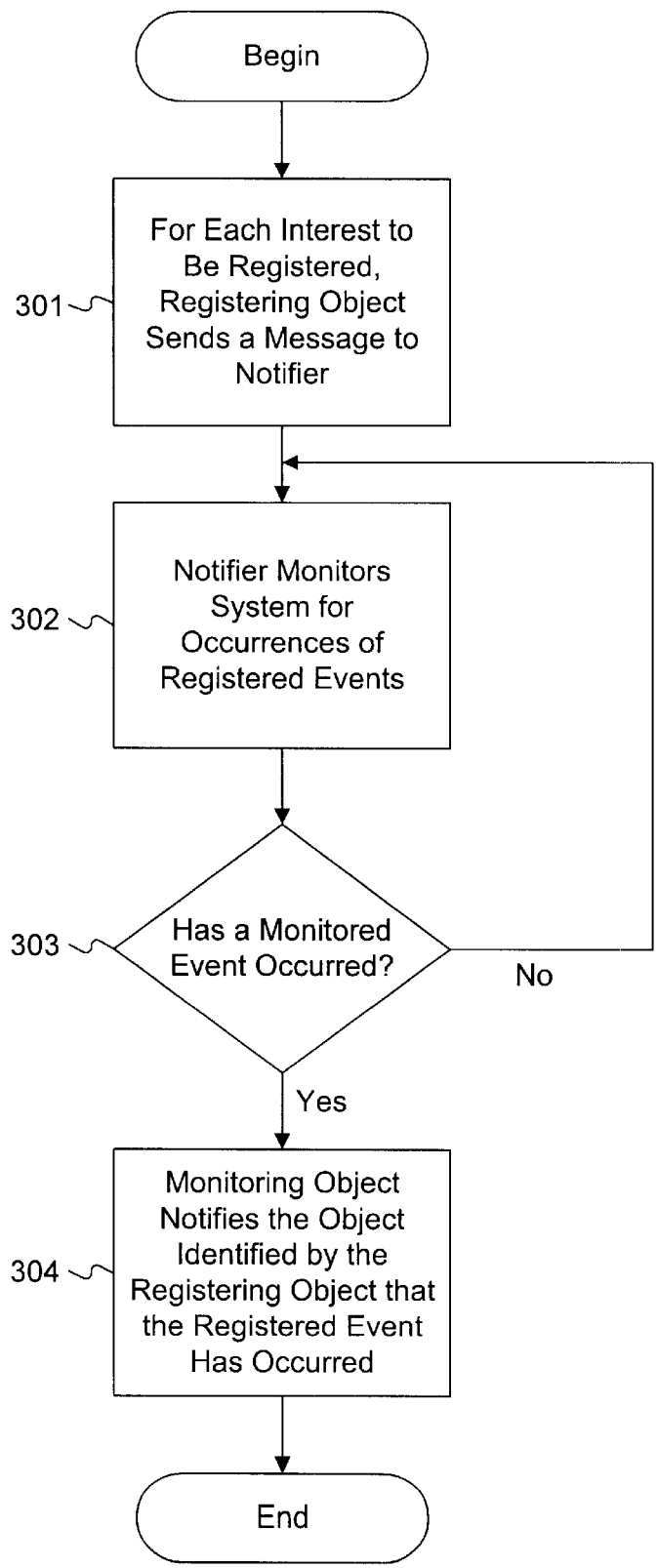
FIG. 3A is a flow chart illustrating methods consistent with the present invention for notifying and transporting behavior in an event based distributed system.

FIG. 3A is a flow chart illustrating methods consistent with the present invention for notifying and transporting behavior in an event-based distributed system. Listener objects interested in the occurrence of a certain event must register an interest in the event. In particular, for each interest to be registered, the registering object sends a message to a notifier process, which is preferably an object containing procedures for monitoring the occurrence of the event (step 301). Generally, the notifier will be present in the virtual machine in which the event is expected to occur. The registration message includes: (1) implicit or explicit information identifying the event that is to be monitored, (2) information identifying the object that is to be notified when the event occurs, and (3) an object, or a reference to an object, that is to be passed to the notified object when the event occurs. The notifier may use a table to store information relating to registration messages it has received, such as the table shown in FIG. 3B. The notifier monitors its system or the network for the occurrence of the event (step 302). When the event occurs (step 303), the notifier notifies the object identified by the registering object that the registered event has occurred (step 304). Consistent with the present invention, the notification includes an identification of the event that occurred and the object or reference to the object that was passed to the notified object when the event occurred (step 304).

An "event" as used throughout this specification can be broadly defined as a change of system state. An event may be, for example, a timer event, a mouse click event, or a disk access event.

Figure 4:
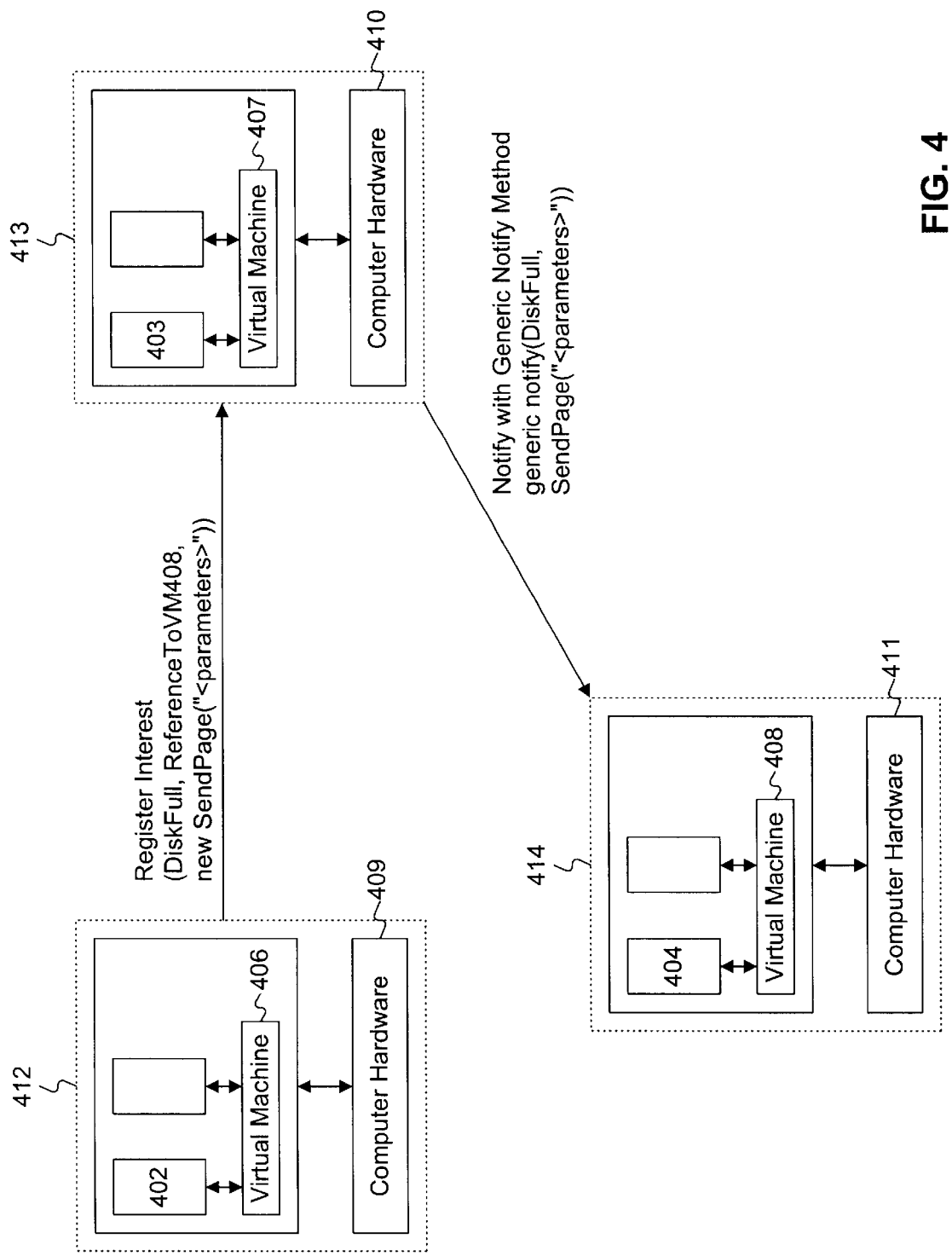
FIG. 4 is a block diagram illustrating a distributed computing system containing three exemplary computer platforms connected to one another via a network.

FIG. 4 is a block diagram illustrating a distributed computing system containing three exemplary computer systems 412, 413, and 414, connected to one another via a network. Computer systems 412–414 are physically similar to computer systems 102 and 112. In particular, each of computer systems 412, 413, and 414 includes a computer platform or machine 409, 410, and 411, respectively, executing a virtual machine 406, 407, or 408. Processes 402, 403, and 404 reside on their respective virtual machines 406, 407, and 408. Consistent with the present invention, computer systems 412, 413, and 414 form a distributed computing system using the event/notification model.

A hypothetical situation illustrating an application of the present invention will now be described with reference to the distributed system shown in FIG. 4. Assume that "administrator" process 402, executing in virtual machine 406, has the responsibility of monitoring the network and reporting potential problems to a human operator—such as a disk drive running out of free space. Notifier process 403, executing on virtual machine 407, monitors the system for the occurrence of disk drive full events. To register interest in a "DiskFull" event, process 402 transmits a registration message, called, for example, "RegisterInterest," to notify process 403, such as the message:

RegisterInterest (DiskFull, ReferenceToVM408, SendPage("<parameters>")). In this message, "DiskFull" identifies the event that is to be monitored, "ReferenceToVM408" is a reference to the entity that is to be notified in response to the occurrence of the event (in this case, virtual machine 408), and "SendPage" is an object that includes methods and data that, when executed on a computer having a telephone connection and the ability to dial a pager number, will instruct the computer to page a person at a specified number.

When the DiskFull event occurs, notifier process 403 notifies the designated entity, virtual machine 408, using a generic notify method including the SendPage object, or a reference to the "SendPage" object, and an indication that the DiskFull event has occurred. In response, virtual machine 408 may create a process such as process 404 that executes the methods designated in the SendPage object. The SendPage object will then cause computer system 411 to page the appropriate technician.

As mentioned above, the notify method is preferably a generic method, meaning each virtual machine and/or computer platform may include its own unique implementation of the notify method, although each implementation must meet the specifications required by the definition of the generic notify method.

Because the SendPage object includes, within itself, all required methods and data for execution, SendPage is considered to be an object having "closure." By passing an object having closure to a designated entity, the object initially registering the object does not have to be aware of the functions available at the final destination of the passed object. This is particularly advantageous as it allows the object initially registering the event to easily modify the functionality of the passed object. For example, if the policy (functionality) of the SendPage object is created by an operator at computer 412, it is relatively easy for the operator to modify the policy of SendPage by, for example, instructing SendPage to page a backup technician if the page is not returned by the primary technician within twenty minutes.

Although SendPage was described as having closure by virtue of having all its required methods and data encapsulated within the object, other objects may be passed that have closure even though code still must be supplied by the executing system. In particular, if the code that must be supplied by the executing system implements well known methods that can be implemented in any one of a number of acceptable ways, the object may have closure merely by referencing the generic method definitions and allow the executing system to provide the precise implementation.

While there has been illustrated and described what are at present considered to be preferred embodiments and methods of the present invention, it will be understood by those skilled in the art that various changes and modifications may be made, and equivalents may be substituted for elements thereof without departing from the true scope of the invention. For example, while the foregoing systems and methods have been described with reference to a Java based run-time environment, other run-time environments could conceivably be used to implement the present invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed:

1. A method for controlling program execution in a distributed computer system comprising the steps of:

registering interest in an occurrence of an event in the distributed computer system, the registration of interest including information identifying the occurrence of the event, an identifier of a software entity in the distributed system, and a first object including a process and parameter data corresponding to the process;

monitoring at least a portion of the distributed computer system for the occurrence of the registered event; and notifying the software entity identified in the registration of interest when the event occurs, the notification including a copy of the first object and an identification of the event that occurred.

2. The method of claim 1, wherein the notification step further includes the step of using a generic notify method to notify the software entity.

3. The method of claim 1, wherein the step of registering interest further includes registering interest by a process located in a virtual machine different than the virtual machine in which the software entity is located.

4. The method of claim 1, wherein the step of monitoring the distributed computer system is performed by a process in a virtual machine different than the virtual machine in which the software entity is located.

5. The method of claim 1, wherein the step of registering interest further includes registering interest by a registering process located in an address space different from an address space in which the software entity is located.

6. The method of claim 1, wherein the step of registering interest further includes registering interest by a registering process and the step of monitoring includes a monitoring process, wherein the registering process is located in an address space different from an address space in which the monitoring process is located.

7. The method of claim 1, wherein the step of monitoring the distributed computer system is performed by a registering process in an address space different from an address space in which the software entity is located.

8. The method of claim 1, wherein the step of registering interest includes registering interest in an occurrence of a change in system state.

9. The method of claim 1, wherein the step of registering interest includes registering interest in an occurrence of one selected from the group consisting of a timer event, a mouse click event, and a disk access event.

10. The method of claim 1, which further comprises the step of executing at least one method contained within the first object in response to the notifying step.

11. The method of claim 10, wherein the notification step further includes the step of using a generic notify method to notify the software entity.

12. The method of claim 10, wherein the step of registering interest further includes registering interest by a process located in a virtual machine different from the virtual machine in which the software entity is located.

13. The method of claim 10, wherein the step of monitoring the distributed computer system is performed by a process in a virtual machine different from the virtual machine in which the software entity is located.

14. A protocol for controlling the execution of processes in a distributed computer system, the protocol comprising the steps of:

receiving a registration of interest in an event that is expected to occur in the distributed computer system, the registration including an identifier of a software entity in the distributed system and a first object, the first object including computer instructions for performing a process and parameter data corresponding to the process;

monitoring the distributed system for the occurrence of the registered event; and notifying the software entity identified in the registration of interest when the event occurs, the notification including a copy of the first object and an identification of the event that occurred.

15. The protocol of claim 14, wherein the notify step further includes the step of using a generic notify method to notify the software entity.

16. The protocol of claim 14, wherein the step of receiving further includes receiving a registration of interest from a process located in an address space different from an address space in which the software entity is located.

17. The protocol of claim 14, wherein the step of monitoring the distributed system is performed by a process in an address space different from an address space in which the software entity is located.

18. The method of claim 14, wherein the step of registering interest further includes registering interest by a registering process and the step of monitoring includes a monitoring process, wherein the registering process is located in an address space different from an address space in which the monitoring process is located.

19. The protocol of claim 14, wherein the event includes a change in system state.

20. The protocol of claim 14, wherein the event includes one selected from the group consisting of a timer event, a mouse click event, and a disk access event.

21. A computer readable medium containing instructions for controlling program execution in a distributed computer system, the instructions causing the distributed computer system to perform the steps of:

registering interest in an event in the distributed computer system, the registration of interest including information identifying the event, an identifier of a software entity in the distributed system, and computer code for executing a process;

monitoring at least a portion of the distributed computer system for the occurrence of the registered event;

notifying the software entity identified in the registration of interest when the event occurs, the notification including a copy of the computer code and an identification of the event that occurred; and executing methods contained within the computer code in response to the notifying step.

22. A computer readable medium containing instructions for implementing a protocol for controlling the execution of processes in a distributed computer system, the instructions causing a computer in the distributed computer system to perform the steps of:

receiving a registration of interest in an event in the distributed computer system, the registration including an identifier of a software entity in the distributed system and a first object, the first object including computer instructions for performing a process and parameter data corresponding to the process;

monitoring the distributed system for the occurrence of the registered event; and notifying the software entity identified in the registration of interest when the event occurs, the notification including a copy of the first object and an identification of the event that occurred.

* * * * *